Dec. 19, 1939.  G. A. PHILIPPE  2,184,126
GLASS CUTTING MACHINE
Filed Dec. 16, 1938  3 Sheets-Sheet 1
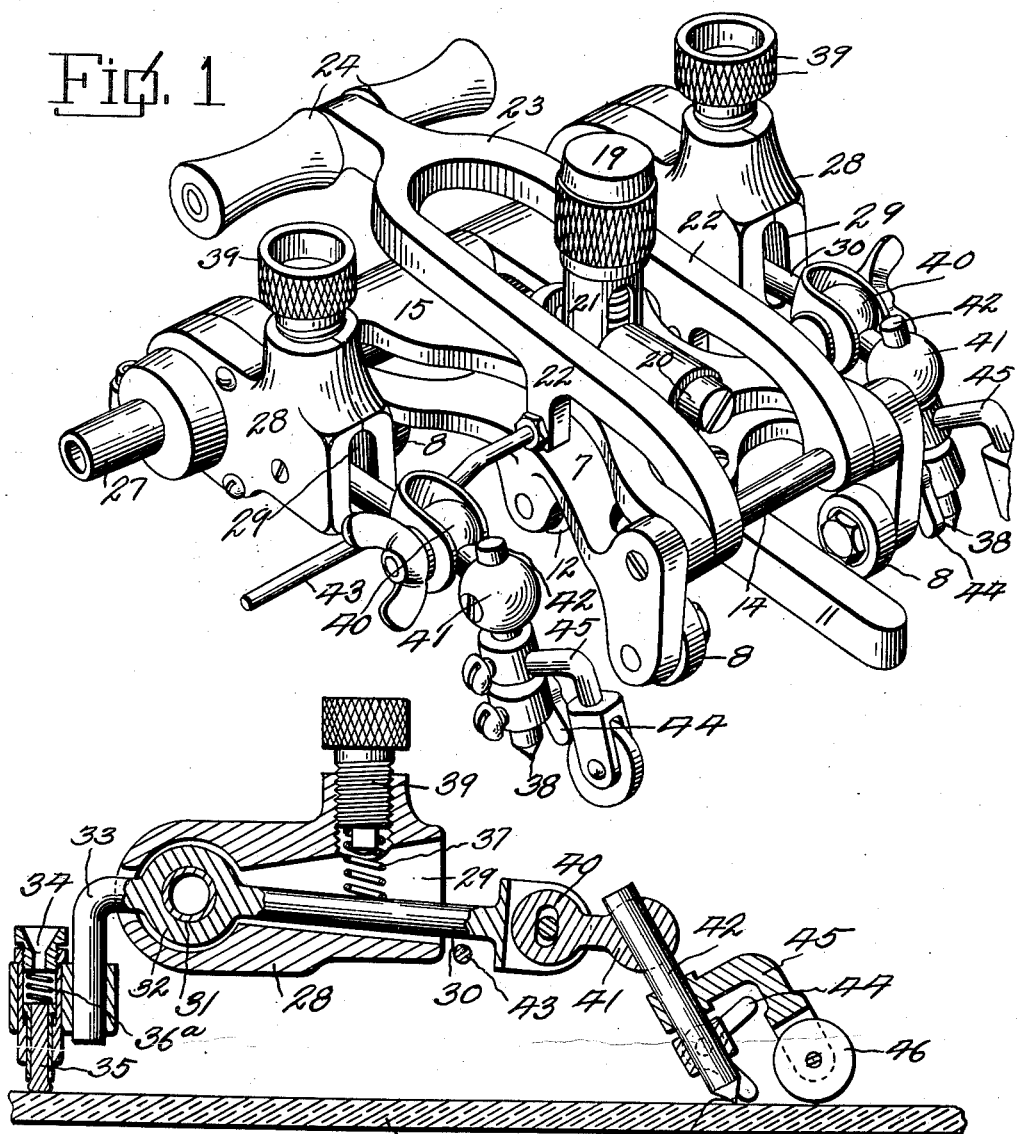
Fig. 1
Fig. 2
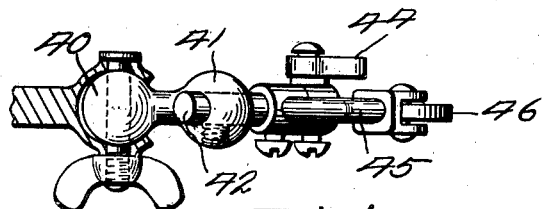
Fig. 3
George A. Philippe
INVENTOR
BY
ATTORNEY Dec. 19, 1939.  G. A. PHILIPPE  2,184,126

GLASS CUTTING MACHINE

Filed Dec. 16, 1938  3 Sheets-Sheet 2

George A. Philippe
INVENTOR

BY
Philip A. H. Terrell
ATTORNEY

Dec. 19, 1939. G. A. PHILIPPE 2,184,126
GLASS CUTTING MACHINE
Filed Dec. 16, 1938 3 Sheets-Sheet 3

George A. Philippe
INVENTOR

BY Philip W.H. Terrell
ATTORNEY

Patented Dec. 19, 1939

2,184,126

UNITED STATES PATENT OFFICE 2,184,126

GLASS CUTTING MACHINE

George A. Philippe, Henryetta, Okla., assignor of one-twentieth to H. B. Dowell, one-twentieth to Archie A. Kinion, both of Sand Springs, Okla., one-twentieth to Beulah M. Slaymaker, and one-twentieth to Otho L. Slaymaker, both of Tulsa, Okla.

Application December 16, 1938, Serial No. 246,227

8 Claims. (Cl. 33—32)

The invention relates to glass cutting machines and has for its object to provide a device of this character wherein one or more glass cutting elements are carried by a traveling carriage, accurately guided on a guide member extending across a sheet of glass, thereby obviating the inaccuracies incident to hand cutting of glass, particularly where the sheets of glass are cut into strips.

A further object is to provide the carriage with a plurality of glass cutting elements whereby a plurality of cuts may be made at one time.

A further object is to mount the cutting elements on pivoted arms carried by the carriage and to provide adjusting means whereby the angle of each cutting element may be adjusted as well as the pressure of the cutting element on the glass, thereby allowing an initial cutting according to the cutting characteristics of the cutter, particularly where a diamond is used.

A further object is to provide the cutting elements with means whereby the elements are maintained out of engagement with the table when they are beyond the edges of the glass, and means whereby the cutting elements are placed on the upper surface of the glass at the starting of the cutting operation. Also to provide means whereby the cutting elements will not drop downwardly at the ends of the cuts as they leave the sheet of glass, thereby insuring a clean continuous cut on the upper surface of the glass only, so a clean break may be accomplished.

A further object is to provide wiper means in alinement with each cutting element and in advance thereof for wiping the glass surface before the cutting elements pass over the same.

A further object is to provide means whereby a fluid may be placed in the wipers for cleaning the surface and facilitating the cutting operation.

A further object is to provide a hinged handle member carried by the carriage and having outwardly extending arms cooperating with the cutter arms for raising said cutter arms upon an upward movement of the handle and for overcoming the spring action on the cutter elements. Also to provide a hinged plate above the carriage frame and a yieldable spring connection between the plate and carriage frame and normally forcing the shaft, on which the cutter elements is mounted, downwardly, said plate being hingedly connected to the carriage.

A further object is to provide a wheel supported glass cutter carriage on a track-way, adapted to be placed across a sheet of glass in various positions whereby one or more straight scorings can be made on the sheet of glass.

A further object is to provide means whereby the cutter elements may be adjusted towards and away from each other for varying the width of cuts and at the same time allowing a plurality of cuts to be made, so that two or more strips of glass can be cut in the same operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the cutter carriage.

Figure 2 is a vertical longitudinal sectional view through one side of the cutter carriage and cutter arm, showing one of the cutters in position on a sheet of glass.

Figure 3 is a top plan view of one of the cutter arms.

Figure 4:
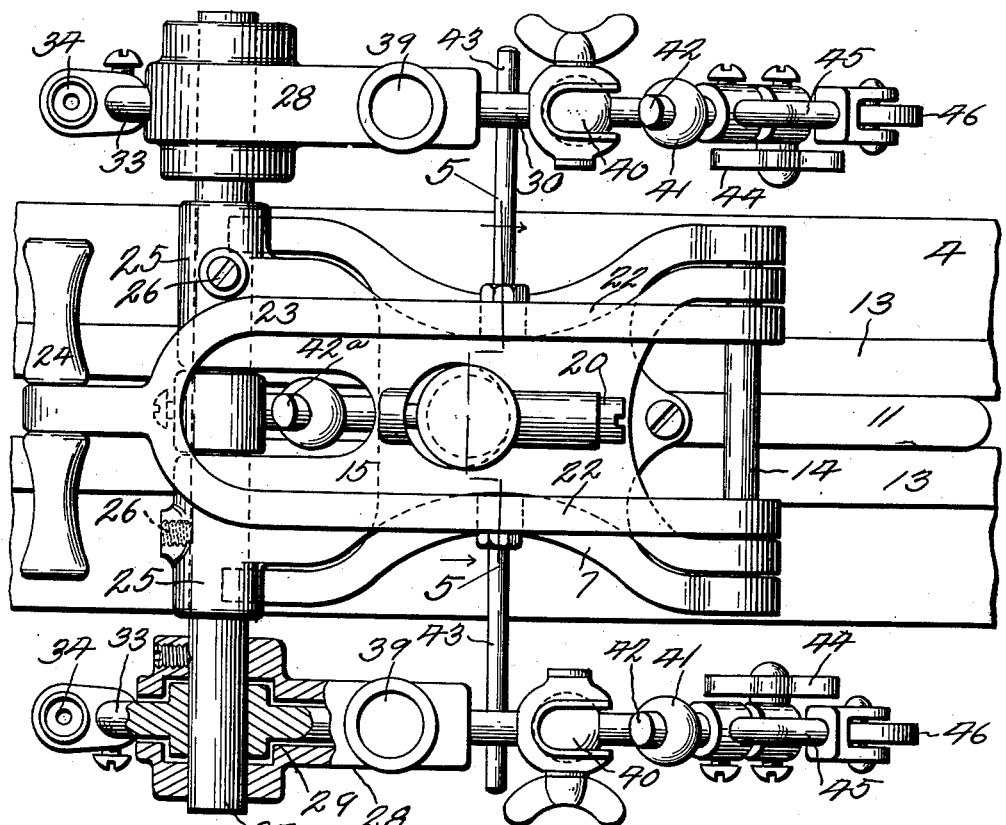
Figure 4 is a top plan view of the cutter carriage, part being broken away to show one of the cutter arms at its mounting.
Figure 5:
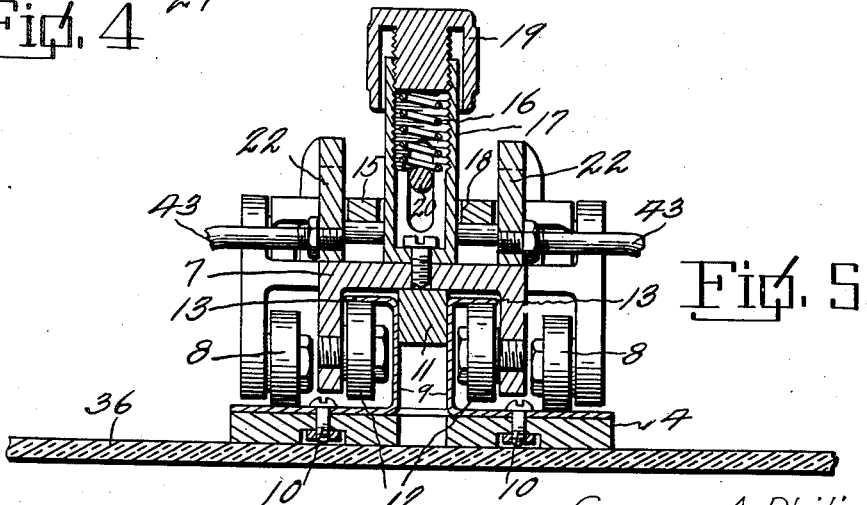
Figure 5 is a transverse sectional view taken on line 5—5 of Figure 4.

Referring to the drawings, the numeral 1 designates a conventional form of cutter table having pins 2 at one end thereof at predetermined distances from each other and between which the triangular shaped end 3 of the rule 4 is adapted to be received. The other end of the rule is provided with any kind of conventional means, for instance a pin 5, on its under side and adapted to be received between the spaced pins 6 at the other end of the table. This structure is conventional, and it is to be understood the device hereinafter set forth may be used in connection with any kind of cutting table.

The cutter carriage comprises a horizontally disposed frame 7, the opposite ends of which are provided with rollers 8, mounted on the upper side of the rule 4, and above upwardly and outwardly extending flanges 9 secured by bolts 10 to the upper side of the rule. The under side of the carriage 7 is provided with a guide bar 11 disposed between the flanges 9 for accurately guiding the carriage in a straight line as it is reciprocated from time to time on the rule. The carriage is held against upward movement on the rule by rollers 12, intermediate the ends of the carriage, and cooperating with the horizontally disposed flanges 13 carried by the members 9, hence it will be seen that upward or side tilting of the frame is prevented. The rear end of the carriage is provided with an axle 14, rigidly carried by the frame 7 and hingedly mounted on the axle 14 is a forwardly extending plate 15, and which plate is normally forced towards the carriage 7 by an expansion spring 16 disposed in a cylinder 17, carried by the upper side of the carriage frame 7 and extending upwardly through an elongated recess 18 in the plate 15. The upper end of the cylinder 17 is provided with a tension adjusting cap 19 and by means of which the spring pressure on the pin 20, carried by the plate 15, may be varied. The pin 20 extends through vertically elongated apertures 21 in the cylinder 17, the purpose of this tensioning operation will presently appear. Hingedly mounted on the axle 14 are the forwardly extending arms 22 of a U-shaped handle member 23, the end of which terminates in oppositely extending gripping handles 24 adapted to be grasped by the operator for operating the carriage mechanism and also for traversing the same over the rule from end to end. The free end of the plate 15 is provided with bosses 25, in which is held, by means of set screws 26, a transversely disposed shaft 27, and which shaft terminates beyond the opposite sides of the carriage frame.

Secured on the ends of the shaft 27 are cutter arm housings 28 having vertically flared chambers 29 therein, and in which are rockably mounted cutter arms 30, and which arms are rockably mounted at 31 on the shaft 27. The bosses 32 of the arms 30 are provided with outwardly and downwardly extending arms 33, which carry liquid receiving cups 34, having felt wipers 35 therein, adapted to wipe over the sheet of glass 36 in advance of cutter points, during a cutting operation, for cleaning the surface and facilitating the cutting operation. The felt wipers are normally forced downwardly by means of springs 36. Disposed within the flared chambers 20 of the members 28 are expansion springs 37 which engage the upper sides of the arms 30 and normally force said arms downwardly.

The combined expansive force of all springs 37 is less than the expansive force of the spring 16, so that upon an initial upward movement of the arms 30 for raising the cutting points 38 the plate 15 will not be raised. The tension of the springs 37 can be adjusted by means of the adjusting screws 39. The outer ends of the arms 30 terminate in ball and socket joints 40, connecting the same to an outwardly extending arm 41, which carried the cutter point shafts 42, which shafts extend downwardly and terminate in cutter points 38. By this ball and socket connection the cutter points can be adjusted at various angles to obtain the best cutting surface of the points, which varies where diamond points are used. It is to be understood that any kind of cutting element may be used, for instance the wheel type if desired.

Extending outwardly from the outer sides of the arms 22 are lifting rods 43 which extend beneath the arms 43 in spaced relation thereto, therefore it will be seen that when it is desired to lift the points 38 from the work, it will only be necessary for the operator to spring the handle member 23 upwardly until the arms 43 engage the under sides of the cutter arms 30 and the continued upward movement of the lifting rods will lift the arms 30 upwardly against the action of the springs 37, and after the arms 30 have reached the limit of their movement the free end of the plate 15 will raise with the shaft 27 against the expansive action of the spring 16.

Figure 7:
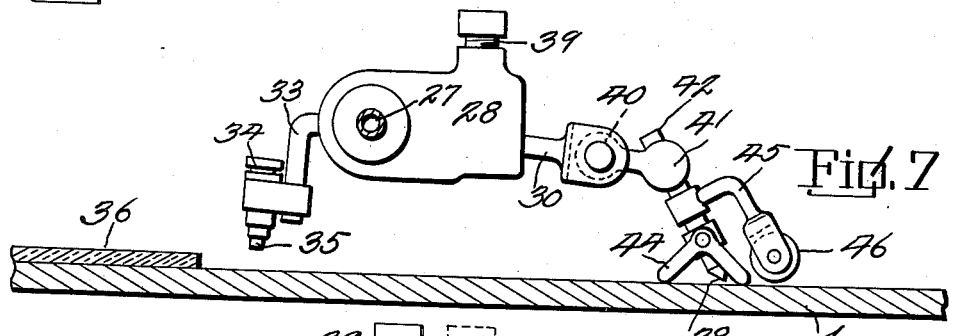
Figure 7 is a side elevation of one of the cutter arms and mounts, showing the same supported from the table and in a position it assumes as it approaches the sheet of glass for a cutting operation.

In operation, the device is provided with means whereby the cutting points, when not on the glass, are maintained spaced from the upper surface of the cutting table 1, as shown in Figure 7, and the wiper felt 35 elevated to a horizontal plane above the upper surface of the glass 36; and also means whereby the cutter points are lowered onto the glass surface at the starting of the cutting operation and means whereby the cutting points are prevented from making a ragged cut at the other edge of the sheet of glass and from dropping onto the table. To accomplish this result the lower end of each cutter shaft 42 is provided with inverted V-shaped members 44, which are gravity actuated, and also with brackets 45, which are provided with supporting wheels 46.

Figure 8:
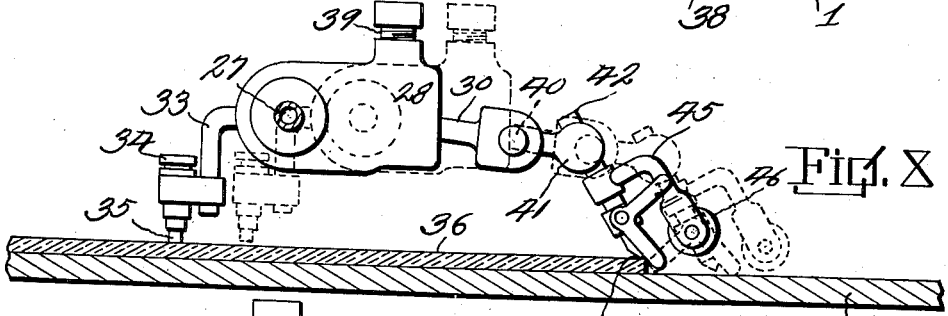
Figure 8 is a view similar to Figure 7, showing in dotted and full lines the elevating means for the cutter point as it is placed on the upper surface of the glass.
Figure 9:
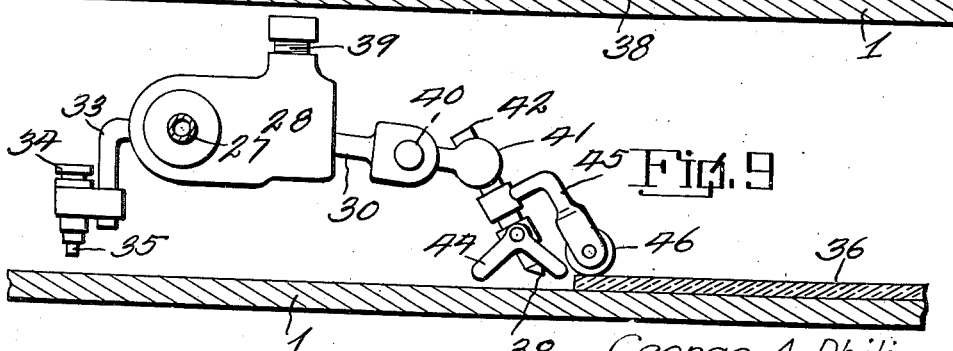
Figure 9 is a view similar to Figures 7 and 8, showing the cutter arm at the end of the cutting operation.

Referring to Figure 7, it will be seen that the V-shaped members 44 will support the points 38 spaced from the table 1 when the points are above the table proper. It will also be seen that the wheels 46 are spaced from the table surface, and the wiper felt 35 is in a plane above the upper surface of the sheet of glass 36. To accomplish a cutting operation the operator grasps the handle member 24 and pulls the carriage towards him on the rule. When the inverted V-shaped member 44 engages the edge of the sheet of glass 36, as shown in Figure 8, the cutter point 38 will be lowered onto the surface of the glass at the extreme edge thereof. As the carriage continues its movement the cutter will score the glass entirely across the same, however as the cutter passes from the other edge of the glass as shown in Figure 9 the roller 46 will engage the glass and prevent the cutter 38 from fracturing the glass edge so that when the glass is broken into strips there will be a clean break. In this position the V-shaped member 44 swings down by gravity and when the roller 46 passes off the glass sheet, the member 44 will prevent the diamond point or cutter from dropping onto the table 1 and being damaged thereby.

Figure 6:
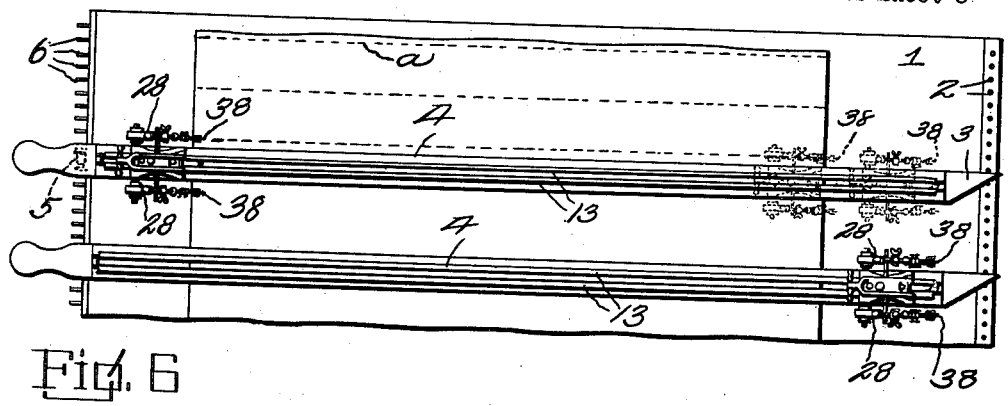
Figure 6 is a top plan view of a portion of a conventional form of glass cutting table, showing a pair of cutting devices mounted thereon.

In Figure 6, a plurality of rules and carriages are shown, it is to be understood any number may be used or any number of cutters may be placed on the carriage. It will be noted in Figure 6 that each carriage makes two cuts at the same time after the initial cut at $a$ for straightening the glass.

At present a great many strips of glass are made for display purposes, for instance in store counters and the like, and fractional size strips, therefore it will be seen by making a plurality of cuts at one time that the cost of production of glass strips is reduced to a minimum.

After completing the cutting operation, the operator swings the handle 23 upwardly, which raises all of the glass engaging mechanism and then shifts the carriage to the other end of the rule and re-positions the rule for the next cutting operation.

From the above it will be seen that a glass cutting device is provided which is simple in construction and one wherein a plurality of cuts may be made at one time and without fracturing the edges of the glass, thereby insuring a clean break.

A third cutting element may be used if desired to operate through the slot in the rule, as shown at 42a in Figure 4.

The invention having been set forth what is claimed as new and useful is:

1. A glass cutting machine comprising a wheel supported carriage, a trackway on which said carriage is mounted and positively guided, a transversely disposed shaft carried by the forward end of said carriage, a rearwardly extending plate hingedly mounted on said shaft and extending rearwardly above the carriage, a transversely disposed shaft carried by the rear end of the plate and movable upwardly and downwardly above said rear end, spring means for normally forcing said plate downwardly towards the carriage, cutter carrying arms mounted on the transversely disposed shaft carried by the rear end of the plate and extending forwardly, a hinged handle member mounted on the shaft at the forward end of the carriage and extending rearwardly and cutter arm lifting members carried by the handle and extending outwardly to positions below the cutter carrying arms and in the path thereof.

2. A device as set forth in claim 1 wherein the cutter carrying arms comprise chambered members rigidly mounted on the transversely disposed shaft at the rear end of the hinged plate, arms hingedly mounted on said shaft within the chambered members and springs within the chambered members and engaging the arms and normally forcing the same downwardly.

3. A device as set forth in claim 1 wherein the means for forcing the plate towards the carriage comprises an expansion spring, a cylinder carried by the carriage and extending upwardly through the plate and in which the spring is disposed and a member carried by the hinged plate and extending into the cylinder beneath the spring and spring tensioning means carried by the cylinder and cooperating with the upper end of the spring.

4. A device as set forth in claim 1 wherein the cutter carrying arms are formed from two sections, one of said sections chambered and rigidly carried by the transverse shaft at the rear end of the plate, the other sections being rockably mounted on the shaft within the chambered section, springs within the chambered section and normally forcing the rockable arm sections downwardly, said springs having a combined tension less than the spring means normally forcing the hinged plate downwardly towards the carriage.

5. A device as set forth in claim 1 wherein the trackway is formed from spaced channel members, the carriage arching said channel members and a guide bar carried by the carriage and slidably mounted between the channel members.

6. A device as set forth in claim 1 wherein the trackway is formed from reversely positioned parallel channel members, said carriage arching the upper sides of said channel members, guide wheels carried by the carriage and disposed within the channel members, said guide rollers being intermediate the forward and rear ends of the carriage and guide rollers carried by the ends of the carriage and engaging the trackway to the outsides of the channel.

7. A device as set forth in claim 1 wherein the cutter carrying arms comprise chambered members mounted on the shaft at the rear end of the plate, rockable members mounted on the shafts within the chambered member and having limiting movement therein, springs within the chambered members and normally forcing said rockable members downwardly and means for adjusting the tension of said last named springs.

8. A glass cutting machine comprising a traversing carriage, said carriage being guidably mounted on a trackway, a plate hingedly connected to the forward end of the carriage and extending rearwardly and having its rear end free, spring means for normally forcing said plate towards the carriage, forwardly extending yieldably mounted cutter arms carried by the rear free end of the plate, a handle member hingedly connected to the forward end of the carriage and extending rearwardly and lifting arms extending outwardly from opposite sides of the handle and terminating beneath the cutter arms whereby said cutter arms will be raised upon upward movement of the free end of the handle.

GEORGE A. PHILIPPE.